March 30, 1948.    B. W. WRIGHT    2,438,593
WELDING METHOD AND APPARATUS
Filed April 29, 1944    5 Sheets-Sheet 1

INVENTOR
Ben W. Wright
BY
ATTORNEY

March 30, 1948.    B. W. WRIGHT    2,438,593
WELDING METHOD AND APPARATUS
Filed April 29, 1944    5 Sheets-Sheet 2
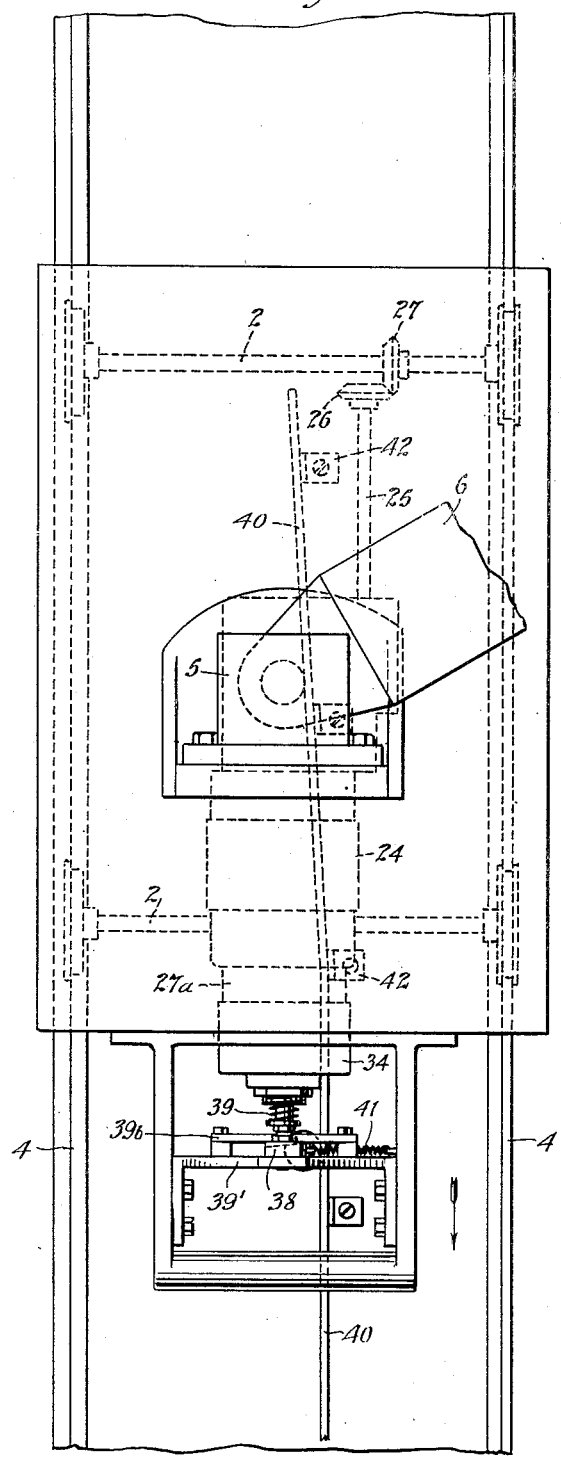
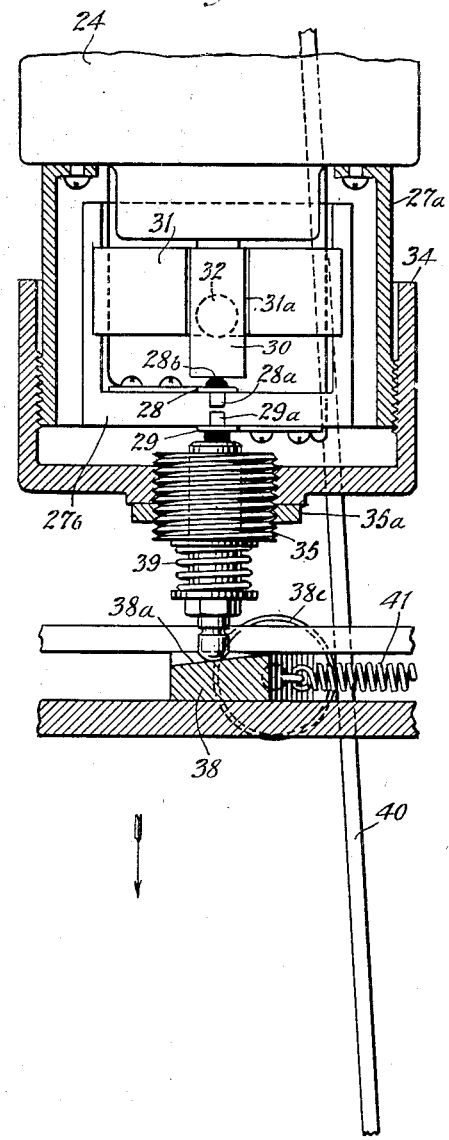
INVENTOR
Ben W. Wright
BY
ATTORNEY March 30, 1948.                B. W. WRIGHT                    2,438,593
                        WELDING METHOD AND APPARATUS
                          Filed April 29, 1944          5 Sheets-Sheet 4
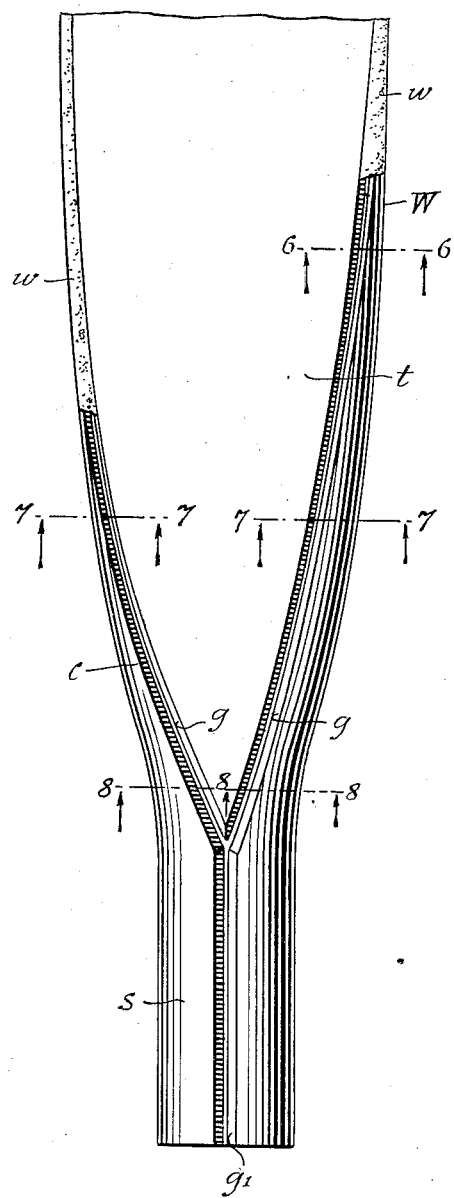
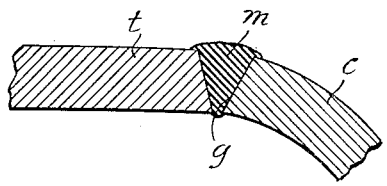
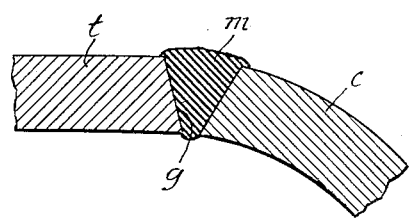
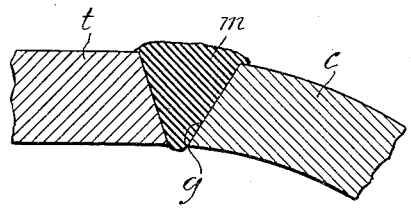
INVENTOR
Ben W. Wright
BY
ATTORNEY

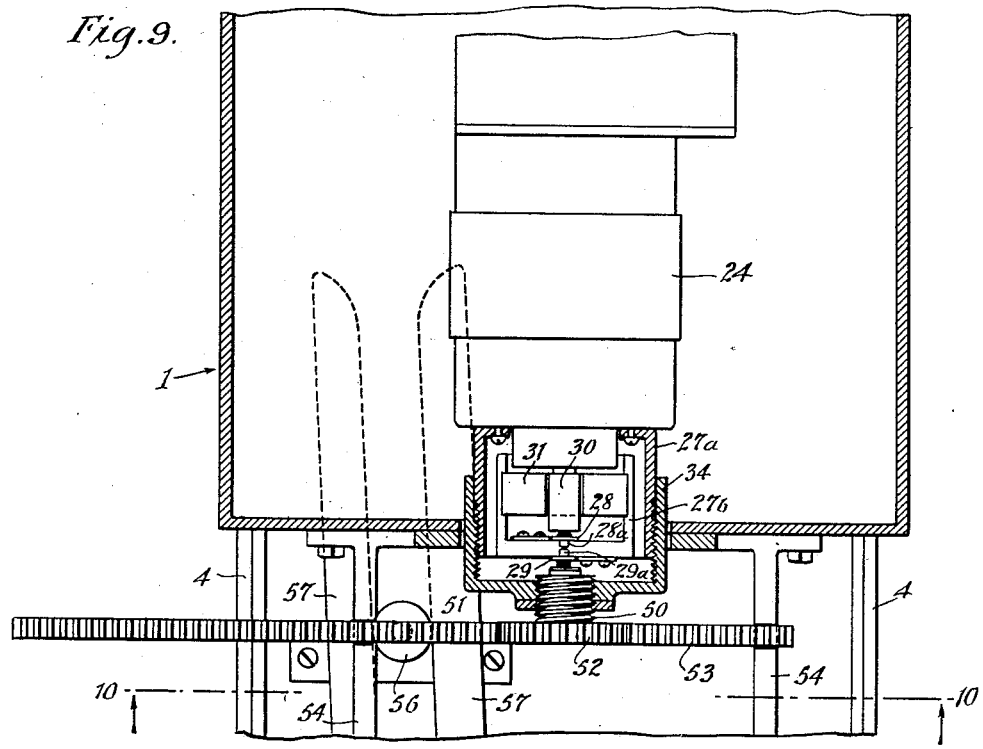
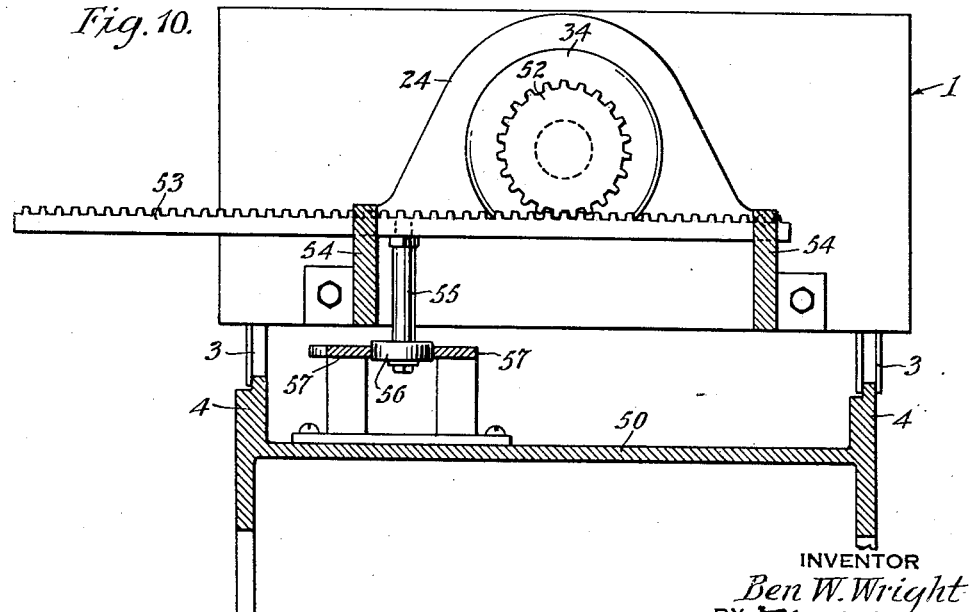

Patented Mar. 30, 1948

2,438,593

UNITED STATES PATENT OFFICE 2,438,593

WELDING METHOD AND APPARATUS

Ben W. Wright, Mountain Lakes, N. J., assignor to Curtiss-Wright Corporation, a corporation of Delaware Application April 29, 1944, Serial No. 533,359

15 Claims. (Cl. 219—8)

My invention relates to a welding method and apparatus.

My invention has particular reference to an automatic welding method, as aforesaid, wherein a function of the welding operation, for example, rate of deposition of weld metal is controlled in a novel manner.

My invention has further reference to welding apparatus wherein the speed of a welding carriage is automatically controlled in accordance with the depth or other dimension of a groove in which the weld metal is deposited.

Various other objects, advantages and features of my invention will become apparent from the following detailed description.

My invention resides in the welding method, automatic features, welding apparatus and arrangements of the character hereinafter described and claimed.

For an understanding of my invention and for an illustration of some of the arrangements utilizable for practicing the same, reference is to be had to the accompanying drawings, in which:

Fig. 2 is a plan view showing part of the apparatus illustrated in Fig. 1;

Fig. 3 is an enlarged plan view, partly in section, showing a part of my novel control mechanism;

Fig. 5 is a plan view showing part of a partially completed propeller blade;

Figs. 6, 7 and 8 are enlarged, transverse sectional views taken on the respective lines 6—6, 7—7 and 8—8 of Fig. 5 looking in the direction of the arrows;

Fig. 9 is a plan view, partly in section, showing a modification of the invention; and Fig. 10 is a vertical sectional view, partly in elevation, taken on the line 10—10 of Fig. 9, looking in the direction of the arrows.

Figure 1:
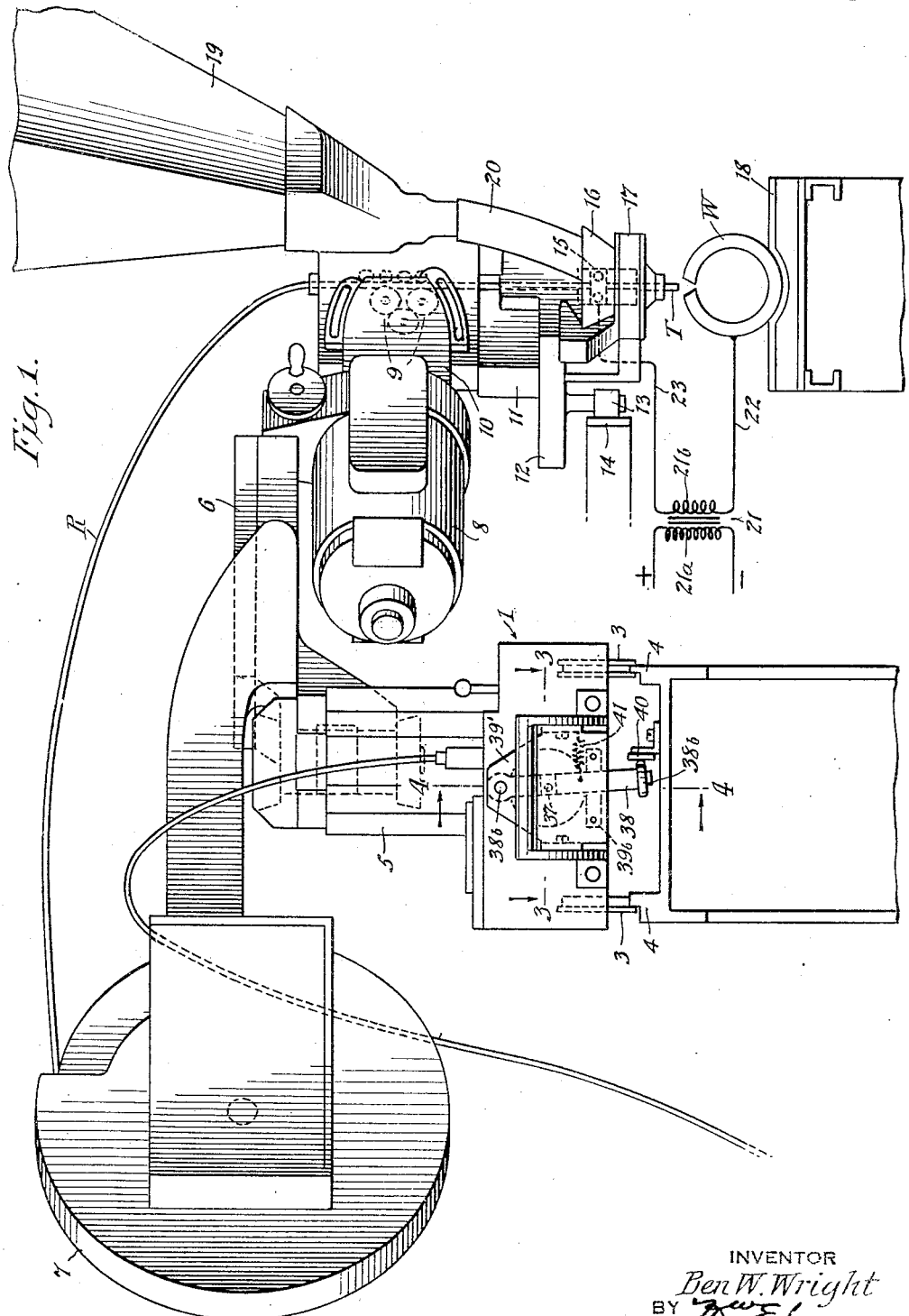
Figure 1 is an elevational view, partly diagrammatic, illustrating welding apparatus for practicing my novel method.

Referring to Fig. 1, I have shown a carriage 1 which comprises a pair of spaced axles 2, Fig. 2, carrying the respective wheels 3 supported by tracks 4, respectively. Secured to the carriage 1 is a standard 5 on which is pivoted a bracket 6 which, at one end, carries a rotatable rod reel 7. At its other end, the bracket 6 carries a housing for a motor 8 which operates wheels 9 for feeding a welding rod R, said wheels 9 being disposed in a housing 10 having secured thereto a support 11 which carries a laterally extending arm 12 having secured thereto a roller 13 coactable with a guide rail 14. Secured to the support 11 are a pair of spaced contact members 15, 15 which extend into a funnel 16 supported in a complementary circular section 17 of the support 11. As shown, the welding rod R passes between the contact members 15, 15 and through the open lower portion of the funnel 16 and circular section 17, the lower end or welding tip T of said welding rod R being close to the work W which, as shown, is a section of a hollow steel propeller blade, the work W being held in fixed position upon a complementary supporting platform 18 in any suitable manner. During the welding operation, suitable welding flux is passed from a hopper 19 which is secured to the housing 10, the flux then passing through a suitable passage 20 to the member 16. As the welding operation proceeds, the flux passes from the funnel-shaped member 16 to the work W.

Welding current is supplied to the described apparatus by a transformer 21 having a primary winding 21a and a secondary winding 21b, one terminal of the latter being connected to the work W by a conductor 22, the other terminal being connected by a conductor 23 to the contact members 15, 15 which, in suitable manner, are biased into engagement with the rod R so as to have good electrical contact therewith while permitting said rod R to move therebetween as the welding operation proceeds.

Referring to Fig. 2, the carriage 1 moves longitudinally upon the tracks 4 under the control of an electric motor 24, the armature of which is geared to a shaft 25 which carries a gear 26 meshing with a gear 27 fast on the axle 2. The welding tip partakes of the longitudinal motion of the carriage 1 but, as shown by Fig. 1, may move to the right or left with respect thereto by reason of the pivotal connection between the standard 5 and the bracket 6, this latter motion being controlled by the contact between the roller 13 and the guide rail 14 which is so designed that the welding tip is always vertically above the joint to be welded.

The motor housing has extending therefrom a tubular section 27a to which is secured an insulating block 27b which, in turn, supports a pair of resilient contact strips 28, 29 provided with facing contact points 28a, 29a respectively. The contact strips 28, 29 are connected in the energizing circuit for the motor 24, this connection being diagrammatically illustrated in Fig. 4 wherein conductors 28b, 29b are shown as secured to the respective contact strips. The conductor 28b is shown as connected directly to the motor 24 whereas the conductor 29b includes a suitable source of electrical energy and a switch 29d.

Figure 4:
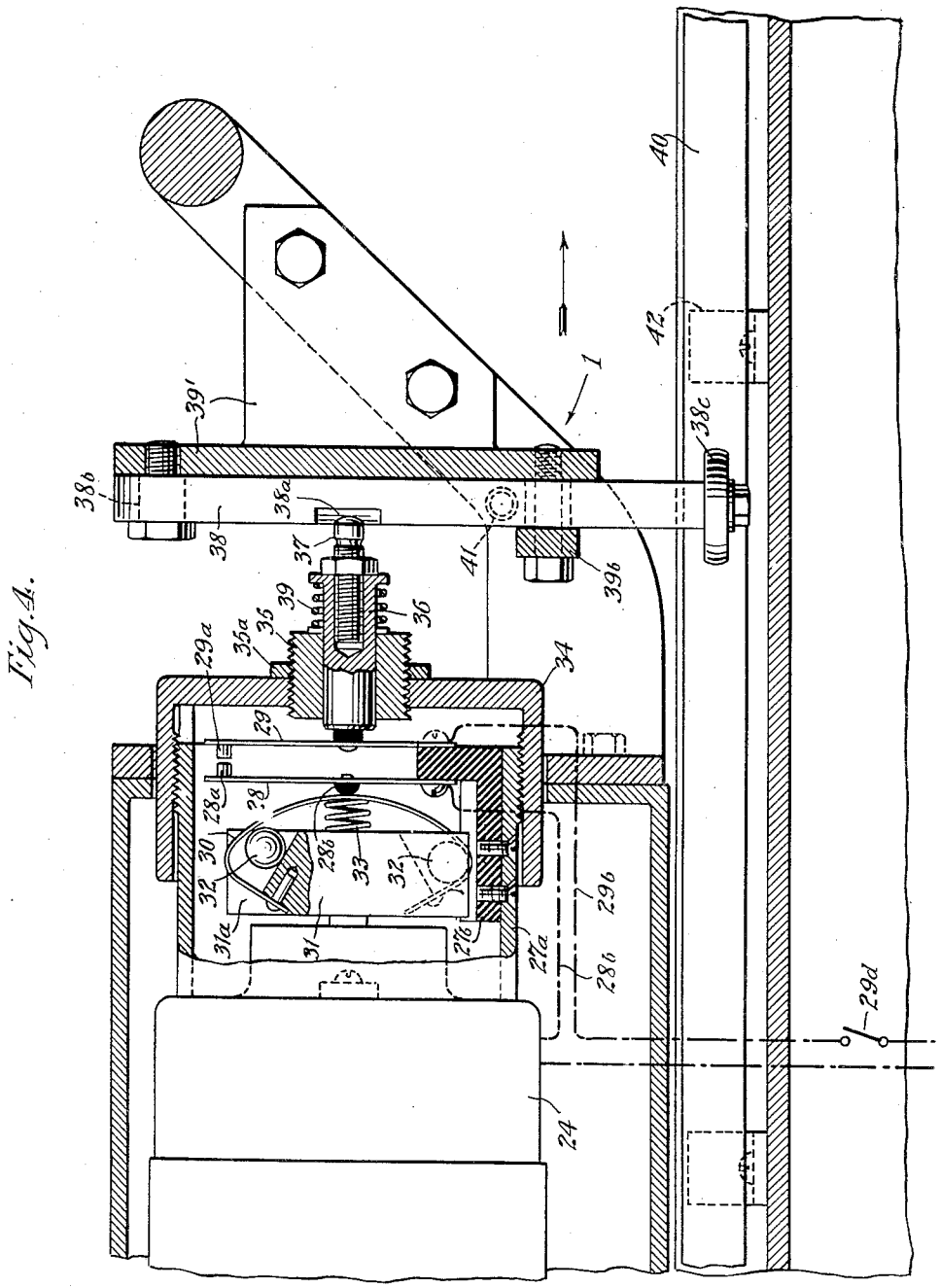
Fig. 4 is a vertical sectional view, partly in elevation, showing another part of my novel control mechanism.

The contact strip 28 carries an insulating button or knob 28b which normally engages a resilient arcuate member 30, the ends of which are secured within slots 31a, Figs. 3 and 4, of a circular disc 31 carried by the armature of the motor 24. Disposed between the arcuate member 30 and the respective outer surfaces of the slots 31a are governor balls 32, 32 which, during operation of the motor 24, urge the arcuate member 30 to the left, Fig. 4, against the pressure of a spring 33 with the result that the contact strip 28 is displaced to the left in accordance with the speed of operation of the motor 24.

Welding apparatus of the general character referred to above is well known in the art and is an example of one of several forms of known apparatus which may be employed when practicing my invention.

Threaded to the tubular member 27a is a cap 34, Figs. 3 and 4, adjustably supporting a tubular threaded member 35 which is held in any desired position longitudinally of the cap 34 by a lock washer 35a. Slidably supported within the tubular member 35 is a rod 36, the left end of which is secured to and insulated from the contact strip 29. The rod 36, at the right, Fig. 4, comprises a threaded tubular passage which receives a lock screw 37 biased into engagement with a cam surface 38a of an arm 38 by a spring 39 which is disposed between the member 35 and the flanged end of the rod 36. As shown in Fig. 4 the arm 38 is pivotally mounted at 38b upon a supporting fixture 39' which is attached to a frame 39a, Fig. 2, secured to the carriage 1. Bolted to the supporting fixture 39' is a member 39b which prevents longitudinal motion of the arm 38 with respect to its support 39. At its lower end, arm 38 carries a roller 38c which is held in engagement with a cam plate 40 by a spring 41, Fig. 3, secured to arm 38 and to the frame 39a. The cam plate 40 occupies a vertical plane and is secured in fixed position in suitable manner as by brackets 42, Fig. 4, anchored to a suitable stationary member.

Referring to Fig. 5, I have shown a partially completed propeller blade which constitutes the work W shown in Fig. 1. This blade is of known construction and comprises a shank s merging into a camber plate c which has a thrust plate t secured thereto by welded joints w terminating short of the blade shank and formed, for example, by a manual welding operation. As the partially completed blade is shown in Fig. 5, each edge of the thrust plate t forms a groove g with the adjacent edge of the camber plate and these grooves g merge into a groove g1 in the blade shank s.

It is well known in the art that the thickness of the camber and thrust plates c and t increases in a direction extending from the tip toward the shank of the blade although the thickness of the material forming the shank s per se is usually uniform. Hence, as regards each groove g, it follows that the dimensions thereof increase in a progressive manner (due to the increase in camber and thrust plate thickness) in a direction extending from the associated welded joint w toward the shank s. More particularly, the depth of each groove g increases (accompanied by increase in width) in the direction last stated. This is illustrated in Figs. 6, 7 and 8 which illustrate the progressive increase in the dimensions of the grooves g which are shown as filled with weld metal m, the latter being deposited, in accordance with the invention, in the manner hereinafter described.

With the propeller blade positioned upon the supporting platform 18, Fig. 1, the guide rail 14 is adjusted in such fashion that the welding tip T is disposed vertically above one of the grooves g at one end thereof, for example, the end adjacent the associated welded joint w, said welding tip T, in this relation, remaining above said groove g as the carriage 1 is moved along the tracks 4, 4 by the motor 24.

During the welding operation, welding flux passes from the hopper 19, Fig. 1, and covers the joint to be welded, the flux facilitating the welding process, as well understood in the art.

Welding current is supplied to the apparatus by a circuit which includes the secondary winding 21b of transformer 21, conductor 23, contact members 14 and 15, welding rod R, welding tip T, the propeller blade and conductor 22. As the carriage 1 moves along the tracks 4 and 4, the welding tip T is disposed vertically above the groove g and the motor 8 feeds the welding rod R into the welding area. Any well-known automatic control system may be utilized in conjunction with the motor 8 to control the rate at which the welding rod is fed and insure that the welding tip T remains substantially a uniform distance above the groove g. With such an automatic control system, a substantially uniform amount of weld metal is fed into the groove g per unit of time.

Referring again to Fig. 5 it will be understood, in view of the foregoing, that passage of the welding tip T along the groove g at constant speed causes an equal amount of weld metal to be deposited in each unit length of said groove g. However, as stated, the cross-sectional area or dimensions of the groove g increases or increase considerably as the shank of the blade is approached. From this, it follows, if the groove g is to be properly filled, that the amount of weld metal deposited must be progressively increased as the shank of the blade is approached. This I accomplish by automatically slowing down the welding tip T as it approaches the blade shank. Inasmuch as a substantially constant amount of weld metal is deposited per unit of time, this decreased speed causes a resultant proportional increase in the amount of weld metal deposited as the shank of the blade is approached.

For any selected position of the contact strip 29, Fig. 4, and, assuming that the contact points 28a, 29a are in engagement, the motor 24 is energized. This causes said motor 24 to increase speed, as regards previously established decreased speed operation thereof, with the result that the governor balls 32 move outwardly causing movement toward the left, Fig. 4 of the arcuate member 30, the contact strip 28, due to its inherent resiliency, following said arcuate member 30 and breaking the motor circuit at the contact points 28a, 29a. As a result, the motor 24 immediately slows down and the centrifugal effect of the governor balls 32 decreases. Accordingly, the arcuate member 30, due to its inherent resiliency, expands toward the right, Fig. 4, to similarly move the contact strip 28 and again close the motor circuit at the contact points 28a, 29a. During operation, this cycle of operation continues in the manner stated above to alternately and rapidly open and close the motor circuit. For any selected position of the contact strip 29, this is a well known prior art operation and produces substantially constant speed of operation of the motor 24 resulting in substantially constant speed of movement of the carriage 1.

In accordance with the invention, the position of the contact strip 29 and its contact point 29a is varied as the welding tip T passes along the groove g. This is done in such manner that, for various positions of said welding tip T lengthwise of said groove g, the contact strip 29 takes positions bearing a definite relation to the respective positions of the welding tip T. In this manner, the carriage 1, as it approaches the shank of the blade, has its speed automatically decreased to thereby cause the deposition of a greater amount of weld metal per unit length of the groove g.

The cam plate 40 is provided for the purpose of obtaining the automatic speed control described above. Thus, referring to Figs. 3 and 4, as the carriage 1 travels in the direction indicated, the roller 38c, which constantly engages the cam plate 40, together with its supporting arm 38 are caused, by the spring 41, to swing in a counterclockwise direction, Fig. 1. This motion of the arm 38, under control of the cam surface 38a, is transformed into longitudinal movement of the rod 36 from left to right, Fig. 4, which, in turn, moves the contact strip 29 from the contact strip 28. This action continues in a progressive manner as the carriage 1 moves toward the shank of the blade.

When the contact strip 29 is in positions progressively removed toward the right from the position shown in Fig. 4, it is necessary for the motor 24 to slow down progressively to greater extents in order for the governor to periodically reestablish the motor circuit at the contact points 28a, 29a. As a result, the average speed of the motor 24 decreases and this continues in a progressive manner so long as the contact strip 29 moves from left to right, Fig. 4.

Accordingly, in view of the foregoing, it will be understood that the cam plate 40, when given the proper configuration and when properly positioned, effects a control on the position of the contact strip 29 whereby a desired progressively decreasing speed of the carriage 1 is obtained. Obviously, this decreased carriage speed may be properly proportioned to the proportionally increasing depths or cross-sectional areas of the groove g (when moving toward the propeller blade shank) that said groove g, throughout the length thereof, is properly filled with weld metal m.

In Fig. 3, the welding carriage is shown in a position taken thereby while welding one of the variable-depth grooves g described above. In such position, as will be understood, the roller 38c cooperates with a section of the cam plate 40 which is angularly disposed with respect to the direction of motion of the welding carriage.

In Figs. 1 and 2, the welding carriage is shown as occupying a position taken thereby during deposition of weld metal in the constant-depth groove g1 of the shank section s. When the welding carriage is positioned as last described, the roller 38c coacts with a section of the cam plate 40 which is disposed parallel with respect to the direction of carriage travel.

In accordance with the invention, then, the cam plate 40 may have such configuration that the welding apparatus is controlled for deposition of weld metal in a groove having varying depths, or, alternatively, in a groove having constant depth. It shall be understood, however, that the invention is not to be thus limited, because, under certain circumstances, it is desirable to practice the invention solely with respect to the deposition of weld metal in grooves having depths or cross-sectional areas which differ in different groove zones.

The cap 34 hereinbefore described, is threaded to the tubular member 27a which projects from the housing of the motor 24. It will be understood that, by rotating the cap 34 in one direction or the other, the position of the contact strip 29 is charged with respect to the position of the contact strip 28. An operation of this character is performed in order to select a base speed of the motor 24 which, subsequently, is varied in the manner hereinbefore described. Obviously, a similar result may be obtained by adjustment of the tubular member 35 in the cap 34.

Referring to the modified form of the invention illustrated in Figs. 9 and 10 wherein parts corresponding with those previously described are identified by the same reference characters, the previously described cap 34 is shown as having a central threaded aperture which receives a screw plug 50 fixed thereto in suitable manner, as by a lock washer 51. Exteriorly of the cap 34, the screw plug 50 carries a pinion 52 which meshes with a rack bar 53 freely supported for horizontal movement on the side members of a frame 54 which is suitably secured to the carriage 1. The rack bar 53 has secured thereto a depending member 55 which, at its lower end, carries a freely rotatable roller 56 disposed in a passage formed by a pair of cam plates 57 secured in suitable manner to any fixed support 58.

The form of the invention shown in Figs. 9 and 10 operates in substantially the same manner as the form previously described. As the carriage 1 moves along the tracks 4 and 4, the cam plates 57 coact with the roller 56 to slowly move the rack bar 53 from left to right. This causes slow rotary movement in a counter-clockwise direction, Fig. 10, of the cap 34 which causes the contact strip 29 and its contact point 29a to recede from the contact strip 28 and its contact point 28a. This, in the same manner as described above, causes the carriage 1 to decrease its speed of movement with resultant increase in the deposition of weld metal per unit length of the groove g.

A present preferred application of the invention relates to the propeller blade art and, as stated, involves deposition of weld metal in grooves having varying depths or cross-sectional areas. Obviously, however, the invention is not to be thus limited because, if desired, the features of the invention may be employed on work of any desired character which is to be subjected to a welding operation.

Obviously, the welding operation may be performed while the welding carriage travels in either direction, that is, either toward the end of the groove having greater depth or toward the end of the groove having less depth. In the latter case, obviously, the arrangement will be such that the carriage speed gradually increases from a base speed. Further, it will be understood that, in so far as the broad inventive idea is concerned, the length of the groove or the direction it extends along the work is immaterial.

In the appended claims, the expression "function of the welding operation" shall be understood as referring to but not limited to the rate of deposition of weld metal. There are other functions of the welding operation, such as current and/or voltage which, in accordance with the broad inventive idea, may be controlled proportionally to the varying depth or cross-sectional areas of a groove in which weld metal is to be deposited and the quoted expression is to be considered as inclusive of such other functions.

The weld metal which is deposited in the groove g is a strip of weld metal having different depths or cross-sectional areas in different zones, respectively. The invention is considered applicable to strips of weld metal of the character stated whether deposited in a groove or on the surface of the work.

While the invention has been described in connection with electric welding, certain broad phases thereof are not to be so limited. Further, the invention is not to be limited to the particular type of apparatus described herein, since it is obvious that various other types of welding apparatus may be utilized as and when desired.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. In the art of depositing weld metal in a groove having differing dimensions lengthwise thereof, the method which comprises feeding a welding rod toward the welding zone, moving the tip of the welding rod along said groove while the feeding operation proceeds, and controlling speed of movement of the rod along the groove in accordance with differing dimensions of said groove.

2. In the art of depositing weld metal in a groove having differing cross-sectional areas lengthwise thereof, the method which comprises feeding a welding rod toward the welding zone, moving the tip of the welding rod along said groove while the feeding operation proceeds, and controlling speed of movement of the rod along the groove in accordance with differing cross-sectional areas of said groove.

3. In the art of depositing a layer of weld metal along work having varying mass along the weld path, the method which comprises feeding a welding rod toward the work, moving the welding rod, while the feeding operation proceeds, along the work to attach the layer of weld metal thereto, and varying the rate at which the welding rod is moved along the work in accordance with differing mass of said work.

4. In the art of depositing weld metal in a groove having different depths lengthwise thereof, the method which comprises feeding a welding rod toward the welding zone, moving the tip of the welding rod along said groove while the feeding operation proceeds, and varying the rate at which the welding rod is moved along the groove in accordance with differing depths of said groove.

5. Welding apparatus comprising a carriage, means carried thereby for feeding a welding rod toward the welding zone, means for moving the welding carriage to thereby cause the tip of the welding rod to move along the work, a control element varying in its control effect during travel of said carriage and in accordance with differing cross-sectional mass of said work, and means controlled by said element for altering the amount of weld metal deposited at different points along the work.

6. Welding apparatus comprising a carriage, means carried thereby for feeding a welding rod toward the welding zone, means for moving the welding carriage to thereby cause the tip of the welding rod to move along the work, a control element varying in its control effect during travel of said carriage and in accordance with differing cross-sectional mass of said work, and means controlled by said element for altering the speed of said carriage as it passes along the work.

7. Welding apparatus comprising a carriage, means carried thereby for feeding a welding rod toward the welding zone, means for moving the welding carriage to thereby cause the tip of the welding rod to move along a groove in the work while disposed vertically thereabove, a stationary cam having configuration varying in accordance with increase in depth of said groove from end to end thereof, and means controlled by said cam for varying the speed of said carriage.

8. In welding apparatus, a welding rod carrying and feeding means, a workpiece carrying means, mechanism for controllably moving one means relative to the other means, said carrying means having thereon work to be welded which is non-uniform throughout the path to be welded, a cam on one of said means having a profile conformed to a desired speed of travel of the rod means relative to the carrying means, a cam follower on the other means, and a device controlled by cam follower movements as caused by said cam to control said mechanism.

9. In welding apparatus, a welding head means, a work carrying means to which work to be welded is secured, the work along the weld path requiring determinate varying deposits of weld metal, a device to move the head means relative to the carrying means along said path, and mechanism responsive to the relative position of said head means and carrying means to control the amount of deposited weld metal at successive points along said path.

10. In welding apparatus, a welding head means, a work carrying means to which work to be welded is secured, the work along the weld path requiring determinate varying deposits of weld metal, a device to move the head means relative to the carrying means along said path, and mechanism responsive to the relative position of said head means and carrying means to control the amount of deposited weld metal at successive points along said path, said mechanism comprising a cam on one means and a cam follower on the other means engaged with said cam to vary the speed of operation of said moving device.

11. In welding apparatus, a welding head means, a work carrying means to which work to be welded is secured, the work along the weld path requiring determinate varying deposits of weld metal, a device to move the head means relative to the carrying means along said path, and mechanism responsive to the relative position of said head means and carrying means to control the amount of deposited weld metal at successive points along said path, said mechanism being so adjusted and regulated as to cause a greater mass of weld metal to be deposited at thick sections of work than at thin sections thereof.

12. In welding apparatus, a welding head means, a work carrying means to which work to be welded is secured, the work along the weld path requiring determinate varying deposits of weld metal, a device to move the head means relative to the carrying means along said path, and mechanism responsive to the relative position of said head means and carrying means to control the amount of deposited weld metal at successive points along said path, said mechanism comprising a cam on one means and a cam follower on the other means engaged with said cam to vary the speed of operation of said moving device, said cam and follower being so formed and arranged as to decrease the relative speed of said means at weld zones where the workpiece is thick, and to increase the relative speed of said means where the workpiece is thin.

13. Welding apparatus comprising a carriage including means for feeding a welding rod toward a welding zone, a work carrier movable relative to said carriage, means for moving the carriage and carrier relative to one another, a cam on the carrier, and means controlled by said cam, during said relative movement, to vary the speed of said relative movement.

14. Welding apparatus comprising a carriage, means carried thereby for feeding a welding rod toward a welding zone, means to move the carriage to cause the welding rod to move along a workpiece, a cam with respect to which said carriage is movable, said cam varying in its configuration in consonance with the mass of weld metal required at successive points along the workpiece, and means controlled by said cam for controlling the mass of weld metal deposited at successive points along the workpiece.

15. Welding apparatus comprising a carriage, means carried thereby for feeding a welding rod toward a welding zone, means to move the carriage to cause the welding rod to move along a workpiece, a cam with respect to which said carriage is movable, said cam varying in its configuration in consonance with the mass of weld metal required at successive points along the workpiece, and means controlled by said cam for varying the speed of said carriage movement relative to said workpiece.

BEN W. WRIGHT.

REFERENCES CITED

The following references are of record in the file of this patent:

UNITED STATES PATENTS

| Number | Name | Date |
|---|---|---|
| 1,604,180 | Lincoln (1) | Oct. 26, 1926 |
| 1,604,181 | Lincoln (2) | Oct. 26, 1926 |
| 2,068,166 | Dodge | Jan. 19, 1937 |
| 2,085,808 | Krause | July 6, 1937 |
| 2,236,998 | Gillette | Apr. 1, 1941 |

OTHER REFERENCES

Steel, August 18, 1941, page 86. (Copy in Scientific Library.)